(12) United States Patent
Berger et al.

(10) Patent No.: US 7,117,751 B2
(45) Date of Patent: Oct. 10, 2006

(54) CORIOLIS MASS FLOW SENSOR HAVING OPTICAL SENSORS

(75) Inventors: Todd Berger, Hatfield, PA (US); Joseph Dille, Hatfield, PA (US); James Birdsall, Hatfield, PA (US); Thomas Brown, Hatfield, PA (US)

(73) Assignee: Emerson Electric Co., St. Louis, MO (US)

(*) Notice: Subject to any disclaimer, the term of this patent is extended or adjusted under 35 U.S.C. 154(b) by 0 days.

(21) Appl. No.: 10/711,708

(22) Filed: Sep. 30, 2004

(65) Prior Publication Data

US 2005/0150311 A1 Jul. 14, 2005

Related U.S. Application Data

(60) Provisional application No. 60/521,223, filed on Mar. 15, 2004, provisional application No. 60/481,852, filed on Jan. 2, 2004.

(51) Int. Cl.
*G01F 1/84* (2006.01)

(52) U.S. Cl. .................................. 73/861.355

(58) Field of Classification Search ........... 73/861.355, 73/861.356, 861.357
See application file for complete search history.

(56) References Cited

U.S. PATENT DOCUMENTS

| | | | |
|---|---|---|---|
| 4,187,721 A * | 2/1980 | Smith | 73/861.356 |
| 4,422,338 A * | 12/1983 | Smith | 73/861.356 |
| 4,559,833 A * | 12/1985 | Sipin | 73/861.355 |
| 4,730,501 A | 3/1988 | Levien | |
| 4,777,833 A | 10/1988 | Carpenter | |
| 4,895,031 A | 1/1990 | Cage | |
| 4,914,956 A | 4/1990 | Young et al. | |
| 5,038,620 A * | 8/1991 | Rogers et al. | 73/861.355 |
| 5,379,649 A * | 1/1995 | Kalotay | 73/861.356 |
| 5,423,225 A | 6/1995 | Cage | |
| 5,473,949 A | 12/1995 | Cage et al. | |
| 5,555,190 A * | 9/1996 | Derby et al. | 73/861.356 |
| 5,648,616 A | 7/1997 | Keel | |
| 5,675,093 A | 10/1997 | Young et al. | |

(Continued)

FOREIGN PATENT DOCUMENTS

DE 42 26 391 A1 2/1994

(Continued)

OTHER PUBLICATIONS

International Search Report and Written Opinion for corresponding International Application No. PCT/US2004/044066.

*Primary Examiner*—Harshad Patel
(74) *Attorney, Agent, or Firm*—Locke Liddell & Sapp LLP

(57) ABSTRACT

A Coriolis mass flow sensor includes a flow tube, a light source, and a light pipe having a light inlet situated to receive light from the light source and a light outlet for emitting light received from the light source. A light detector receives light from the light pipe light outlet, and a drive device vibrates the flow tube such that the flow tube moves through a light path between the light outlet of the light pipe and the light detector. In certain embodiments, the light pipe defines a generally square cross section. A sensing aperture having a predetermined shape is situated between the light outlet of the light pipe and the light detector. The sensing aperture passes a portion of the light emitted from the light outlet of the light to the light detector, such that the light entering the light detector has the predetermined shape.

14 Claims, 7 Drawing Sheets

U.S. PATENT DOCUMENTS

| | | |
|---|---|---|
| 5,854,430 A | 12/1998 | Drahm et al. |
| 6,513,392 B1 | 2/2003 | Barger et al. |
| 6,526,839 B1 | 3/2003 | Barger et al. |
| 6,606,917 B1 | 8/2003 | Sund et al. |
| 6,711,958 B1 | 3/2004 | Bitto et al. |
| 6,748,813 B1 * | 6/2004 | Barger et al. .......... 73/861.355 |
| 6,769,301 B1 | 8/2004 | Barger et al. |
| 6,807,868 B1 | 10/2004 | Nakao et al. |
| 6,860,158 B1 | 3/2005 | Bitto et al. |
| 2003/0031444 A1 | 2/2003 | Croteau et al. |
| 2003/0097881 A1 | 5/2003 | Schlosser et al. |

FOREIGN PATENT DOCUMENTS

| | | |
|---|---|---|
| EP | 1 182 433 A | 2/2002 |
| JP | 2003 121664 A | 4/2003 |

\* cited by examiner

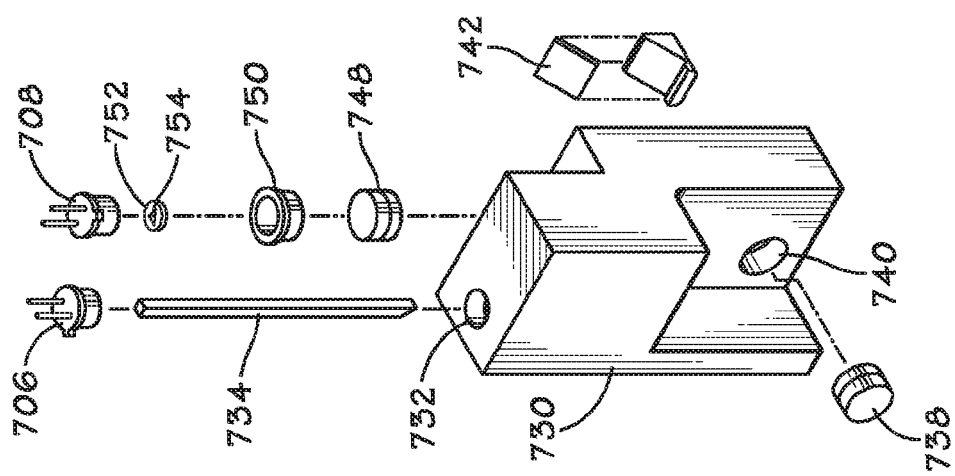
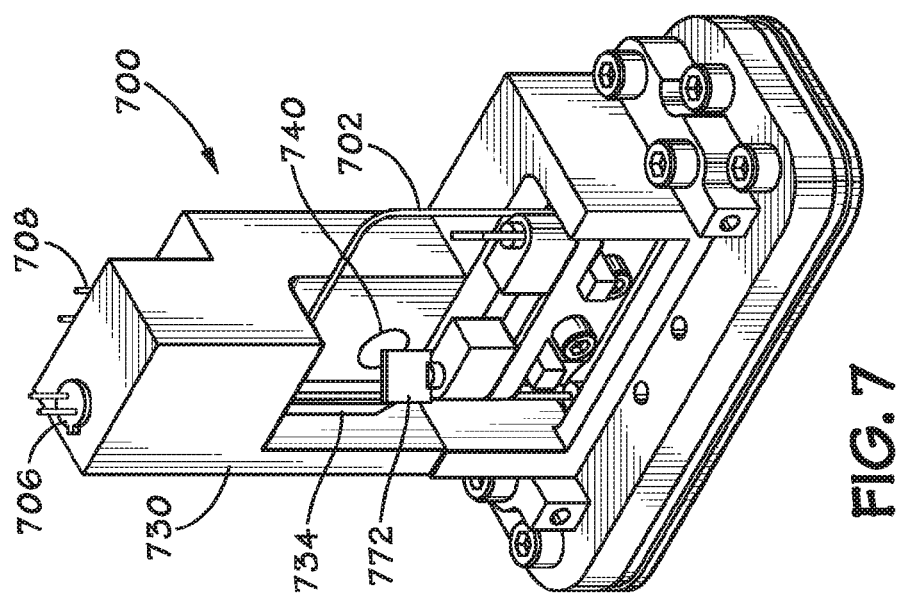

CORIOLIS MASS FLOW SENSOR HAVING OPTICAL SENSORS

CROSS-REFERENCE TO RELATED APPLICATIONS

This application is a non-provisional of U.S. Provisional Patent Application Ser. Nos. 60/481,852 and 60/521,223, filed on Jan. 2, 2004 and Mar. 15, 2004, respectively, which are incorporated by reference herein.

BACKGROUND

The invention relates generally to a mass flow measurement and control, and more particularly, to a mass flow measurement and control device based on the Coriolis force effect.

Mass flow measurement based on the Coriolis force effect is achieved in the following manner. The Coriolis force results in the effect of a mass moving in an established direction and then being forced to change direction with a vector component normal to the established direction of flow. This can be expressed by the following equation:

$$\vec{F}_C = 2\vec{M} \times \vec{\omega}$$

Where $$\vec{F}_C$$

(the Coriolis force vector) is the result of the cross product of $$\vec{M}$$

(the momentum vector of the flowing mass) and $$\vec{\omega}$$

(the angular velocity vector of the rotating coordinate system).

In a rotating system, the angular velocity vector is aligned along the axis of rotation. Using the "Right Hand Rule", the fingers define the direction of rotation and the thumb, extended, defines the angular velocity vector direction. In the case of the typical Coriolis force flow sensor, a tube, through which fluid flow is to be established, is vibrated. Often the tube is in the shape of one or more loops. The loop shape is such that the mass flow vector is directed in opposite directions at different parts of the loop. The tube loops may, for example, be "U" shaped, rectangular, triangular or "delta" shaped or coiled. In the special case of a straight tube, there are two simultaneous angular velocity vectors that are coincident to the anchor points of the tube while the mass flow vector is in a single direction.

The angular velocity vector changes directions since, in a vibrating system, the direction of rotation changes. The result is that, at any given time, the Coriolis force is acting in opposite directions where the mass flow vectors or the angular velocity vectors are directed in opposite directions. Since the angular velocity vector is constantly changing due to the vibrating system, the Coriolis force is also constantly changing. The result is a dynamic twisting motion being imposed on top of the oscillating motion of the tube. The magnitude of twist is proportional to the mass flow for a given angular velocity.

Mass flow measurement is achieved by measuring the twist in the sensor tube due to the Coriolis force generated by a fluid moving through the sensor tube. Typical known devices use pick off sensors comprising magnet and coil pairs located on the flow tube where the Coriolis force's induced displacement is expected to be greatest. The coil and magnet are mounted on opposing structures, for example, the magnet is mounted on the tube and the coil is mounted on the stationary package wall. The coil will move through the magnet's field, inducing a current in the coil. This current is proportional to the velocity of the magnet relative to the coil.

In low flow applications, however, the tube is relatively small. This makes it difficult or impossible to mount sensing hardware on the tube itself. Prior art solutions to sensing the tube vibrations have been largely unsatisfactory. The present invention addresses shortcomings associated with the prior art.

SUMMARY

In accordance with aspects of the present disclosure, a Coriolis mass flow sensor includes a flow tube, a light source, and a light pipe having a light inlet situated to receive light from the light source and a light outlet for emitting light received from the light source. A light detector receives light from the light pipe light outlet, and a drive device vibrates the flow tube such that the flow tube occludes a light path between the light outlet of the light pipe and the light detector. In certain embodiments, the light pipe defines a generally square, or other polygon-shaped, cross section to scramble or "mix up" the light received from the light source to achieve a more spatially uniform intensity distribution at the tube.

A sensing aperture having a predetermined shape is situated between the light outlet of the light pipe and the light detector. The sensing aperture passes a portion of the light emitted from the light outlet of the light to the light detector, such that the light entering the light detector has the predetermined shape. The shape of the sensing aperture, and thus the light reaching the light detector, is a triangle in exemplary embodiments.

The various components may be situated in one or more optics module bodies, which may define openings therein that receive the components. To achieve the desired package size, the openings may be oriented in various directions, and mirrors and lenses may be employed to direct the light as necessary.

BRIEF DESCRIPTION OF THE DRAWINGS

Other objects and advantages of the invention will become apparent upon reading the following detailed description and upon reference to the drawings in which:

FIG. 7 is a perspective view of a Coriolis mass flow sensor shown in FIG. 5 with one optics module body removed.

FIG. 8 is an exploded view of one of the optics modules shown in FIG. 5.

Figure 1:
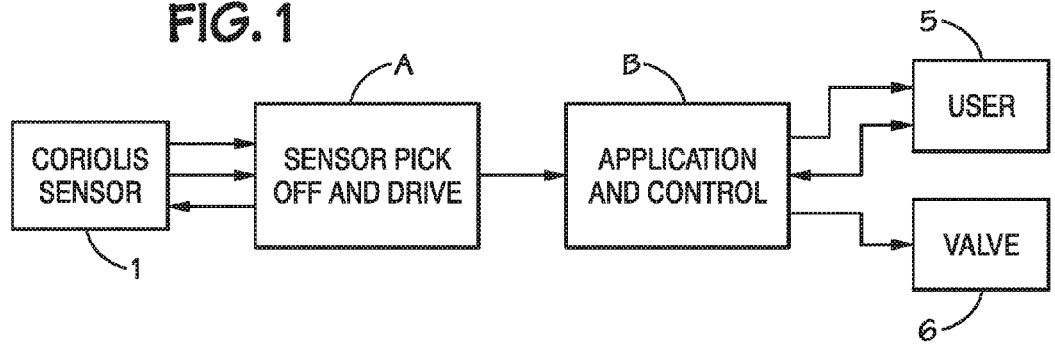
FIGS. 1 and 2 are block diagrams conceptually illustrating a Coriolis mass flow controller and sensor in accordance with aspects of the present disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 illustrates a Coriolis based mass flow sensor and controller in accordance with embodiments of the present invention. It is comprised of essentially two separate operational systems: a Coriolis sensor pick off and drive system A, and an application and control system B. The Coriolis sensor pick off and drive system interfaces with the Coriolis sensor 1. The application and control system B provides an interface for a user 5, and provides control signals to a flow control device such as a valve 6.

The purpose of the sensor pick off and drive system A is to control and sense the motion of the Coriolis sensor 1 for the purpose of determining relative mass flow as a function of Coriolis force, and relative density as a function of resonant frequency.

The exemplary sensor pick off and drive system A provides three data values to the application and control system B:

DeltaT—the time difference that relates to the phase lag of one side of the sensor tube to the other indicating relative mass flow.

Frequency—the resonant frequency of the sensor tube that relates to the relative density of the measured material.

Temperature—an RTD is measured to determine the temperature of the sensor tube.

The application and control system B uses DeltaT in conjunction with calibration constants to present the desired mass flow units to the user 5. It also uses Frequency in conjunction with calibration constants to present the desired density and/or volumetric flow units to the user 5. Temperature is used for compensation of both mass flow and density calculations. The application and control system B uses the mass or volume flow unit output in comparison with the user's set point input to control the valve 6 that regulates flow to the desired setting.

Figure 2:
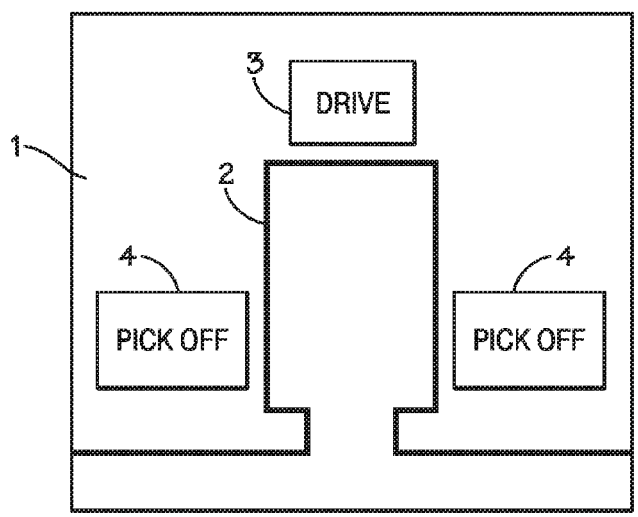

FIG. 2 is a block diagram conceptually illustrating portions of a Coriolis mass flow sensor as disclosed herein. The Coriolis mass flow sensor 1 includes a flow sensor tube 2, with a drive device 3 situated relative thereto so as to vibrate the tube 2. Pick off sensors 4 are positioned relative to the tube 2 so as to measure the twist in the tube 2 due to Coriolis force.

Mass flow measurement is achieved by measuring the twist in the sensor tube due to the Coriolis force generated by a fluid moving through the sensor tube. For example, in known Coriolis mass flow sensors, pick off sensors comprising magnet and coil pairs are typically located on the flow tube where the Coriolis forces induced displacement is expected to be greatest. The coil and magnet are mounted on opposing structures, for example, the magnet is mounted on the tube and the coil is mounted on the stationary package wall. The coil will move in and out of the magnet's field, inducing a current in the coil. This current is proportional to the velocity of the magnet relative to the coil. Since this is a velocity measurement, the velocity, and thus the signal, is at the maximum when the flow tube crosses its rest point (zero crossing). The Coriolis force induced twist causes a phase shift in the velocity signal that is detected by measuring the difference in the zero crossing times between the two velocity sensors. In practice this places a large accuracy burden on the time measurement circuitry. This may limit the ultimate sensitivity of mass flow measurement by this technique.

U.S. Pat. No. 5,555,190, assigned to the assignee of the present application, discloses digital signal processing methods and devices for determining frequency and phase relationships of a vibrating sensor tube such as the tubes disclosed in conjunction with the Coriolis mass flow sensing devices disclosed herein. The entire specification of U.S. Pat. No. 5,555,190 is incorporated by reference herein.

Figure 3:
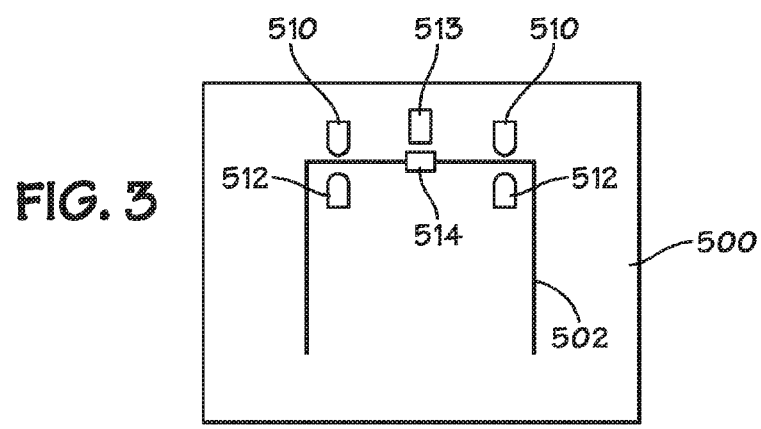
FIG. 3 is a block diagram generally illustrating portions of a Coriolis mass flow device employing an optical pick off sensor in accordance with the present disclosure.

FIG. 3 illustrates an exemplary Coriolis mass flow sensing device employing concepts disclosed herein. The illustrated Coriolis mass flow sensing device 500 includes, among other things, a flow tube 502 with a coil 513 situated near a magnet 514 to vibrate the tube 502. Light sources 510 are positioned on the sides near the top or on top of the flow tube 502 where the displacement is expected to be the greatest. Photodiodes or other photo detectors 512 can then be placed on the opposite side of the tube 502 facing the light source 510. The photo detectors 512 are connected to sensor electronics that process the signals received from the photo detectors 512. The sensor electronics may employ digital signal processing devices, such as the signal processing methods disclosed in U.S. Pat. No. 5,555,190, or the lock in amplifier arrangement as disclosed in U.S. patent application Ser. No. 09/641,698, which is incorporated by reference. Other embodiments are envisioned that use modal sensing or sinusoidal curve fit, wherein the received signal is compared to a reference using least squares phase determination, for example.

In one specific embodiment, the light sources 510 and photo detectors 512 are part of an optical sense circuit implemented on an optical sense printed circuit board (PCB). The light sources 510 and photo detectors 512 comprise infrared LEDs and photodiodes to sense the motion of the sensor tube 502. As shown in FIG. 3, there are two sets of LEDs 510 and photodiodes 512, one set to sense each side of the sensor tube 502. In other embodiments, other types of light sources and detectors may be employed, using light of virtually any wavelength.

Figure 4B:
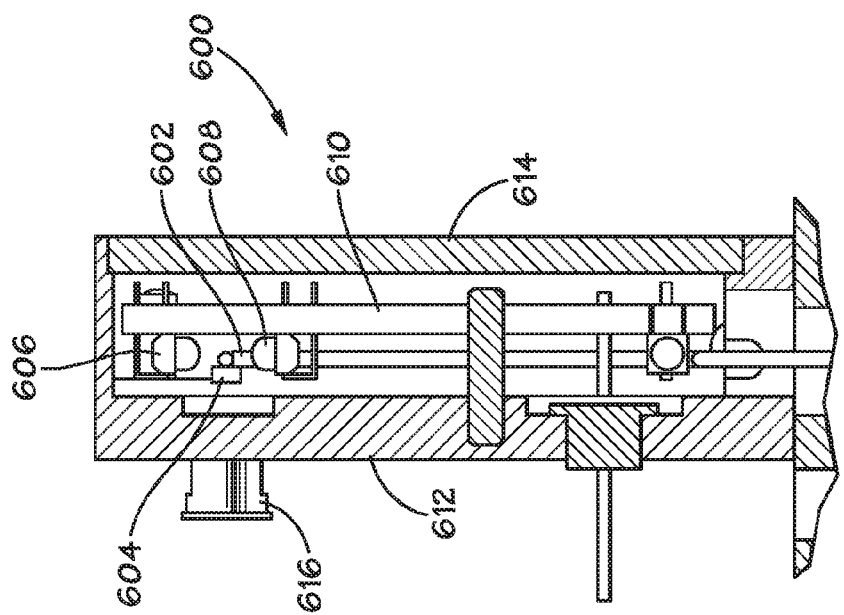
FIGS. 4A and 4B are front and side sectional views, respectively, of the flow sensing portion of a Coriolis mass flow controller using an optical pick off sensor.
Figure 4A:
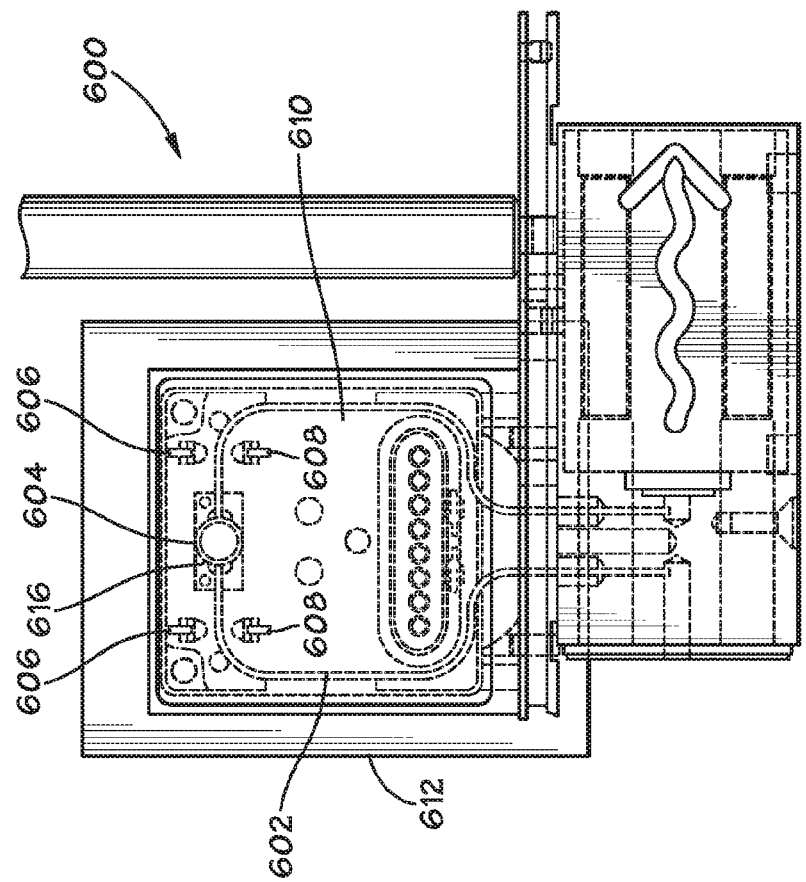

FIGS. 4A and 4B illustrate a Coriolis mass flow sensor 600 employing optical pick off sensors. The flow sensing portion 600 includes the flow sensor tube 602, to which a magnet 604 is attached. Infrared LEDs 606 and photodiodes 608 are coupled to an optical sense PCB 610, positioned on either side of the flow sensor tube 602. The flow sensor tube 602, magnet 604, LEDs 606, photodiodes 608 and PCB 610 are all situated within a housing 612, to which a cover 614 is attached. A 1 mH inductor functions as a coil 616 to drive the tube. The coil 616 is positioned outside the housing 612.

Alternatively, the sensor tube 602, drive device 604,616 and pick off sensors 606,608 all may be contained within the housing 612, or selected components in addition to or in place of the coil 616 may be positioned outside the housing 612. For example, certain embodiments may employ a housing 612 having a window defined therein. This allows the light source 606 and/or photo detector 608 to be placed outside the housing 612. In still further embodiments, the sensor electronics are remoted from the housing 612, for example, using fiber optic cable. This may be desirable, for example, when the Coriolis mass flow sensing device is employed in a hazardous environment.

As disclosed above, the light source 606 and detector 608 may comprise an infrared LED matched to an infrared photodiode. The size of the photodiode active surface is close to but slightly larger than the diameter of the sensor tube 602. As the tube 602 vibrates, it moves through the path between the LED and photodiode, occluding the light from the LED. The tube 602 may be positioned so that the light path between the LED and detector is partially broken when the tube is at rest. As the tube moves about this rest position in a vibratory fashion, the light reaching the detector will alternately be at a minimum or maximum providing a sinusoidal output from the detector. The relative outputs from each side of the tube can be measured for phase differences due to Coriolis induced flow effects.

An LED produces light with a specific intensity distribution. The distribution is known to be Gaussian—the light intensity decreases as the radial distance from the center of the light source increases. In other words, the light source is brightest in the center and gets dimmer towards the periphery of the light source. Thus, the intensity of the light reaching the photodiode varies not only in response to the vibrating tube moving through the light path, but also based on the position of the tube relative to the light path. With the simple LED/photodiode arrangement illustrated in FIGS. 3 and 4, alignment of the tube is critical to accurately measure the twist in the flow sensor tube as peak to peak voltages must be matched between the two sensors.

Such matching of the peak to peak voltages is difficult to achieve because the response is not linear. Only at specific points in the optical path will the two legs of the tube produce matching peak to peak voltages. This need to precisely align the tubes can have the effect of lowering manufacturing yields and increasing manufacturing time and costs. If however, the response were linear, the two legs of the tube could be located anywhere in the linear region and the peak to peak voltages would match.

Figure 6:
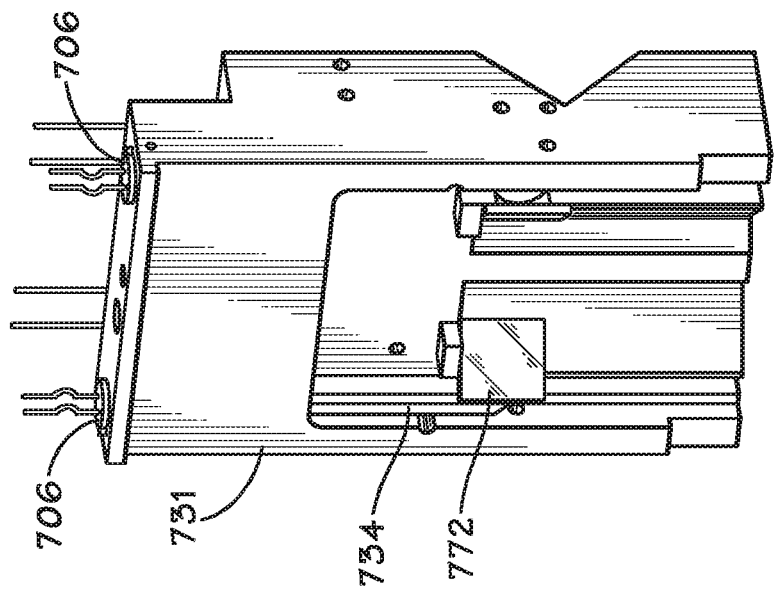
FIG. 6 is a perspective view of an optics module body for a Coriolis mass flow sensor in accordance with additional aspects of the present disclosure.
Figure 5:
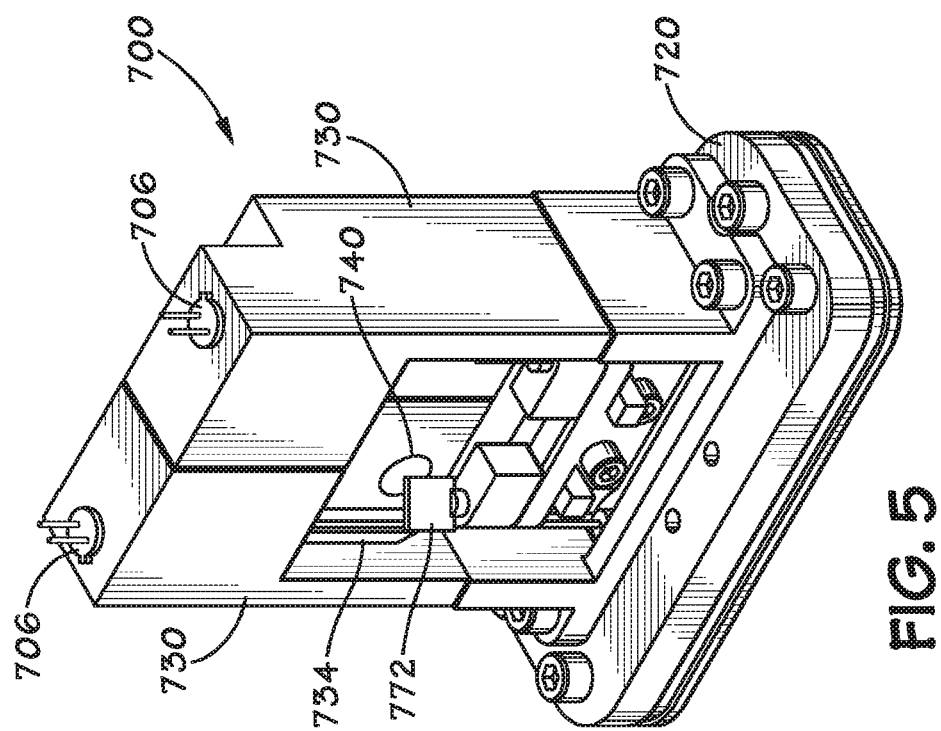
FIG. 5 is a perspective view of a Coriolis mass flow sensor in accordance with other aspects of the present disclosure.

Other embodiments using optical sensing optimize the system to achieve a linear optical response. Among other things, the light emitted by the LED is conditioned to produce a flat power distribution. The image of the flow tube blocking some of the light from the LED (shadow) is passed through a series of lenses and apertures. FIG. 5 illustrates an exemplary Coriolis mass flow sensor 700 with such optical pick off sensors. The mass flow sensor 700 includes a base member 720 to which the flow tube 702 is attached. A drive arrangement (not shown in FIG. 5), such as a coil and magnet arrangement as shown in FIGS. 4A and 4B, is used to vibrate the tube 702. The optical pick off sensors are disposed in first and second optical module bodies 730. FIG. 6 illustrates an alternative embodiment in which the two optical bodies 730 are combined into a single optical body 731. FIG. 7 shows the flow sensor 700 with one of the optical modules 730 removed to better show some of the components, such as the flow tube 702.

Figure 9:
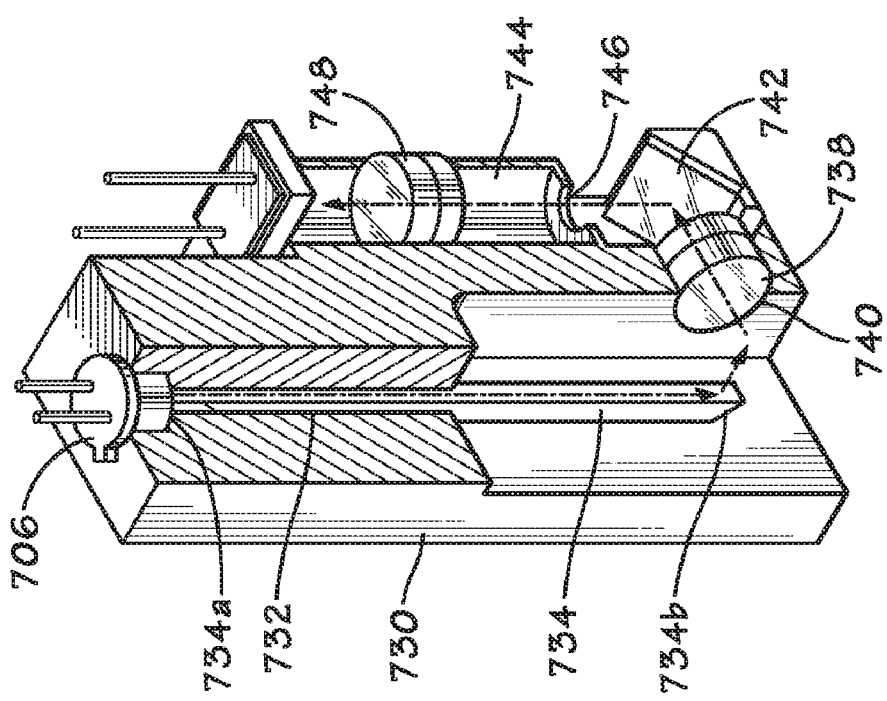
FIG. 9 is a sectional view of one of the optics modules shown in FIG. 5.

An exploded view of one of the optical modules 730 is shown in FIG. 8, and FIG. 9 is a sectional view of the module 730 showing the components internal to the module 730. A light source, such as an LED 706, is disposed in a first opening 732 in the module 730. A light pipe 734 is situated in the opening 732 to receive light from the LED 706. A second opening 740, which is oriented generally perpendicular to the opening 732, has a lens 738 is situated therein. A mirror 742 is positioned between the second opening 740 and a third opening 744 that is generally parallel to the first opening 732. The third opening 744 defines a circular blocking aperture 746 and has a lens 748, a tube 750 and a disk 752 defining a sensing aperture 754 situated therein. A light detector, such as a photodiode 708, is also received in the third opening 744.

The light pipe 734, or integrating bar, has a light inlet 734a that receives light from the LED 706 and a light outlet 734b that emits the light. The light pipe 734 defines a generally square cross section that functions to scramble, or "mix up," the light by reflecting the light off the inside surfaces of the light pipe 734. This evens the brightness of the light output by the LED 706, transforming the Gaussian optical output into a flat power distribution. The output of the LED 706 has a bright spot in the middle and is dimmer towards the outer edges, while the output of the square light pipe 734 is square with even brightness. In other embodiments, the light pipe 734 may define cross-sectional shapes other than square. Almost any polygon (triangle, square, pentagon, etc.) will produce a much more uniform distribution than a circular light pipe. Other methods, such as diffusers, can also be used to produce a uniform light distribution.

In the illustrated embodiments, the sensing aperture 754 is in the shape of a triangle. Accordingly, the light entering the photodiode 708 is in the shape of the triangle. The mirrors and lenses are configured to form an image of the tube, and the triangular sensing aperture 754 is located at the image of the tube edge. The blocking aperture 746 is circular to provide a telecentric distribution of light rays striking the sensing aperture 754 and the detector 708.

Figure 10:
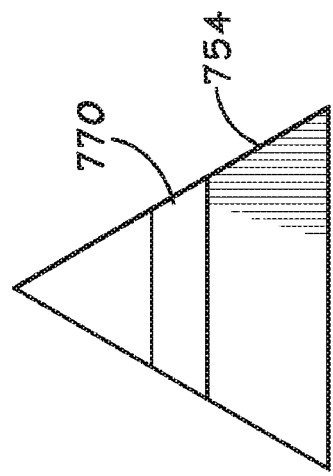
FIG. 10 conceptually illustrates the sensing aperture of the Coriolis mass flow sensor shown in FIG. 5.

The tube 702 is positioned such that, when it vibrates, it moves through the light path established by the light emitted from the light pipe 734—the tube 702 creates a shadow 770 in the triangularly-shaped image, such that the light pattern at the detector 708 is an occluded image of the light source, as generally shown in FIG. 10. The triangular shape of the sensing aperture 754 allows a simple calculation of the power entering the photodiode 708. Throughput (T) is the ratio of the power not blocked by the tube 706 to the total power entering the photodiode 708, which reduces to the ratio of the area of the sensing aperture not blocked by the tube ($A_{nb}$) to the total area of the triangle ($A_{tot}$):

$$T = \frac{A_{nb}}{A_{tot}}$$

As the tube 702 moves in one direction, the throughput increases, and as it moves in the opposite direction the throughput decreases. This motion generates a sine wave with a peak to peak voltage which must match for each leg of the tube. The peak to peak voltage is directly related to the slope of T as a function of y in FIG. 11. Since this is by definition linear the slope is constant. Therefore, the peak to peak voltage can be matched as long as both legs of the tube are located such that the values of y range from the tube diameter to the triangle height.

Figure 11:
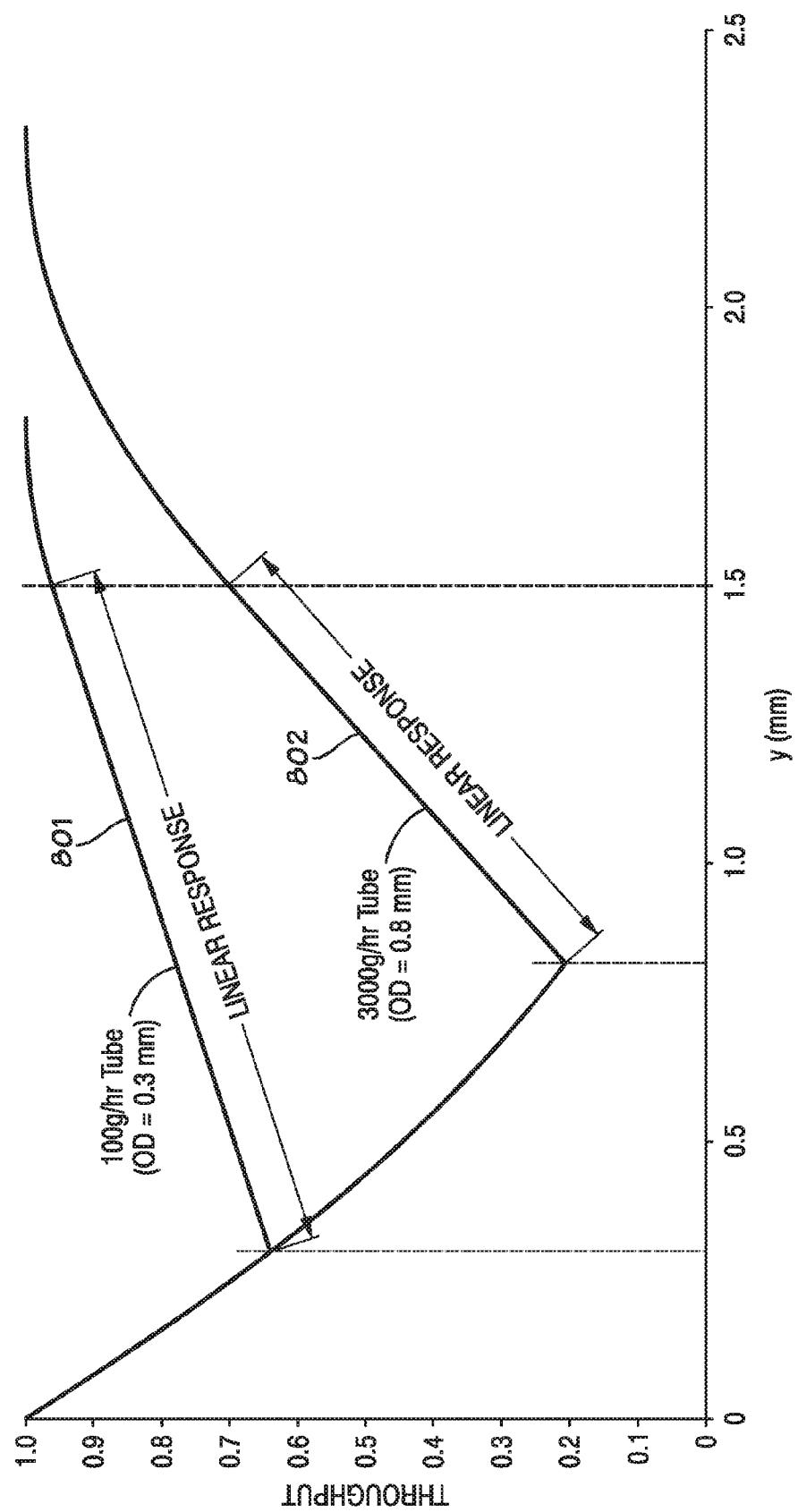
FIG. 11 is a chart illustrating response curves showing linear response regions for exemplary flow tubes.
Figure 12:
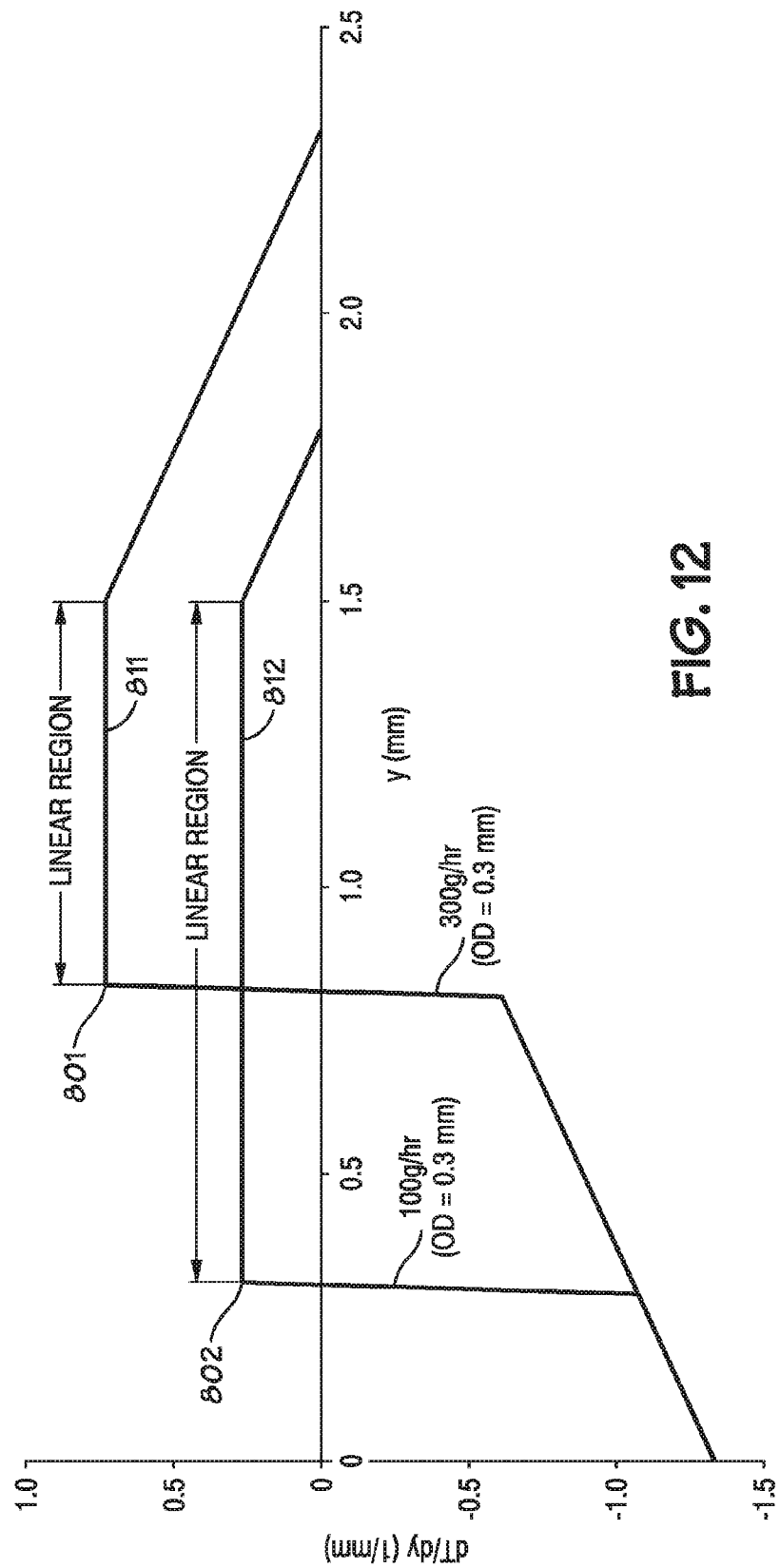
FIG. 12 is a chart showing the slopes of the curves illustrated in FIG. 11.

FIG. 11 shows two response curves: curve 801 is for a 100 gram per hour tube having an outside diameter of 0.3 mm, and curve 802 is for a 3,000 gram per hour tube having an outside diameter of 0.8 mm, with the triangular aperture 754 having a height of 1.5 mm. FIG. 12 shows the slopes of the response curves 801, 802. As shown in FIGS. 11 and 12, the slopes of the curves 801, 802 are constant in the linear response regions 811, 812 of the curves. Thus, it is not necessary for the two legs of the tube to be located at exactly the value of y where the peak to peak voltage will match. The two legs of the tube need only be located in the linear response range as described above. For the 100 gram per hour tube (curve 801), with on leg of the tube located in the allowed range, the opposing leg can be located anywhere within the optical path from the tube diameter (0.3 mm) to the triangle height (1.5 mm). The allowed manufacturing range is thus 1.5–0.3=1.2 mm.

Other sensing arrangements are contemplated. For example, a square sensing aperture could be employed. Two light detectors may be used side by side, wherein the light reaching the respective detectors will vary with movement of the tube.

The mirrors and lenses allow the components to fit into the desired package size. FIG. 9 generally shows the light path through the module body 730. Light from the LED 706 enters the light inlet 734a of the light pipe 734. As noted above, the sides of the light pipe 734 mix the light to achieve a square, even intensity pattern. In the illustrated embodiment, the light outlet 734b is angled and polished so that it functions as a mirror to change direction of the light. As shown, for example, in FIG. 7, a turning mirror 772 is situated between the first and second openings 732, 740 to direct the light into the second opening 740. The tube 702 is positioned between the light outlet 734b and the turning mirror 772 so that the tube 702 moves through the light path established by the light emitted from the light pipe 734. In the embodiment shown in FIG. 6, the turning mirrors 772 are integrated into the module body 731.

The turning mirror 772 directs the light into the lens 738 situated in the second opening 740. The mirror 742 directs the light from the second opening into the third opening 744. The blocking aperture 746 blocks stray light to maintain to the square, even density. The light passes trough the lens 748 and the sensing aperture 754 and is received by the photodiode 708. The lenses 738, 748 and the blocking aperture 746 function to maintain a magnification of 1:1.

The LED 706 and photodiode 708 are connectable to electronics outside the module body 730, allowing the electronics to be located at a distance from the optics. This facilitates use in environments that may be hazardous to the electronics. In other embodiments, the LED 706 and photodiode 708 are also located remotely from the module body 730 with fiber optics links connecting them to the passive optics components located in the module body 730. This allows use in high temperature applications, for example.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A Coriolis mass flow sensor, comprising:
 a flow tube;
 a tube position sensor, including
 a light source;
 an optics module body defining first and second openings, the second opening having an axis oriented generally transverse to an axis of the first opening;
 a light pipe received in the first opening of the optics module body, the light pipe having a light inlet situated to receive light from the light source, and a light outlet for emitting light received from the light source;
 a lens situated in the second opening of the optics module body for receiving light from the light pipe light outlet;
 a light detector for receiving light from the light pipe light outlet; and
 a drive device for vibrating the flow tube, such that the flow tube moves through a light path between the light outlet of the light pipe and the light detector.

2. The Coriolis mass flow sensor of claim 1, wherein the light pipe defines a polygon-shaped cross section.

3. The Coriolis mass flow sensor of claim 2, wherein the light pipe defines a generally square cross section.

4. The Coriolis mass flow sensor of claim 1, further comprising a sensing aperture having a predetermined shape situated between the light outlet of the light pipe and the light detector, the sensing aperture passing a portion of the light emitted from the light outlet of the light pipe to the light detector, such that the light entering the light detector has the predetermined shape.

5. The Coriolis mass flow sensor of claim 4, wherein the predetermined shape is optimized to improve the linearity of the tube position sensor.

6. The Coriolis mass flow sensor of claim 4, wherein the predetermined shape is a triangle.

7. The Coriolis mass flow sensor of claim 1, wherein the light outlet is angled to direct the light emitted from the light outlet in a desired direction.

8. The Coriolis mass flow sensor of claim 1, wherein the optics module body defines a third opening having an axis oriented generally parallel to the axis of the first opening, the third opening having the light detector, and the sensing aperture situated therein.

9. The Coriolis mass flow sensor of claim 8, further comprising a mirror adjacent the second and third openings to direct light from the second opening into the third opening.

10. The Coriolis mass flow sensor of claim 8, further comprising a blocking aperture situated in the third opening, the blocking aperture blocking a portion of the light emitted from the light outlet of the light pipe.

11. The Coriolis mass flow sensor of claim 10, further comprising a lens situated in the third opening.

12. The Coriolis mass flow sensor of claim 1, further comprising a mirror adjacent the first and second openings to direct light from the light outlet of the light pipe into the second opening.

13. The Coriolis mass flow sensor of claim 12, wherein the light outlet of the light pipe and the mirror are on generally opposite sides of the flow tube.

14. The Coriolis mass flow sensor of claim 1, further comprising:
- a second light source;
- a second light pipe having a light inlet situated to receive light from the second light source, and a light outlet for emitting light received from the second light source; and
- a second light detector for receiving light from the second light pipe light outlet.

* * * * *